(No Model.) 4 Sheets—Sheet 1.

G. W. McCASLIN.
CONVEYER.

No. 486,789. Patented Nov. 22, 1892.

WITNESSES:
R. B. Shepherd
Harbert Blossom

INVENTOR:
George W. McCaslin
By Henry Connett
Attorney.

(No Model.) 4 Sheets—Sheet 2.

G. W. McCASLIN.
CONVEYER.

No. 486,789. Patented Nov. 22, 1892.

WITNESSES:

INVENTOR:
George W. McCaslin
By Henry Connett
Attorney.

(No Model.) 4 Sheets—Sheet 3.

G. W. McCASLIN.
CONVEYER.

No. 486,789. Patented Nov. 22, 1892.

WITNESSES:

INVENTOR:
George W. McCaslin

By Henry Connett
Attorney.

(No Model.) 4 Sheets—Sheet 4.
G. W. McCASLIN.
CONVEYER.
No. 486,789. Patented Nov. 22, 1892.
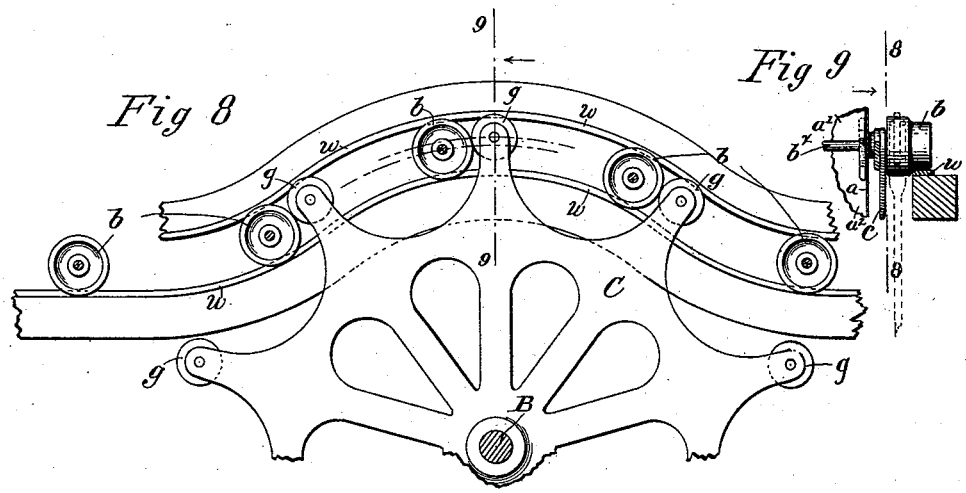
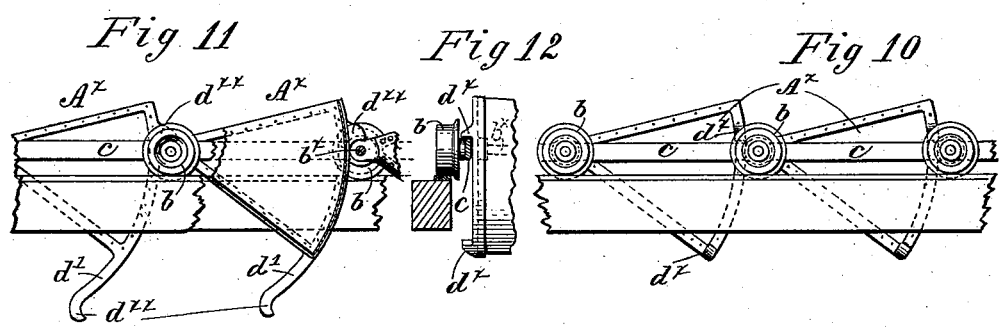
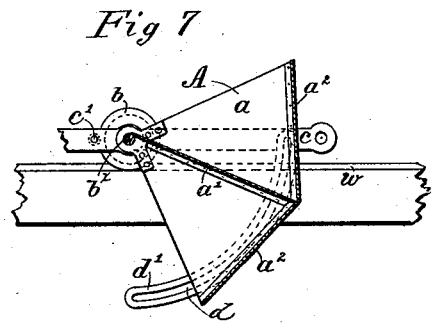
WITNESSES:
INVENTOR:
George W. McCaslin
By Henry Connett
Attorney.

UNITED STATES PATENT OFFICE.

GEORGE W. McCASLIN, OF MONTCLAIR, NEW JERSEY.

CONVEYER.

SPECIFICATION forming part of Letters Patent No. 486,789, dated November 22, 1892.

Application filed March 5, 1892. Serial No. 423,862. (No model.)

*To all whom it may concern:*

Be it known that I, GEORGE W. MCCASLIN, a citizen of the United States, residing at Montclair, in the county of Essex and State of New Jersey, have invented certain Improvements in Conveyers, of which the following is a specification.

My invention relates to the class of conveyers comprising an endless series of buckets or receptacles mounted on wheels which run on track-rails, the buckets being connected together somewhat in the manner of a chain and driven from some point or points in the line of the chain or system. This class of conveyers is usually employed for conveying coal and the like from one point to another and usually from the loading-point to a delivery or dumping point at a higher level.

My improvements relate in part to the construction and manner of mounting the buckets, in part to the dumping mechanism, in part to the means for controlling the loading or filling of the buckets, and in part to the mechanism for driving the conveyer.

Figure 1:
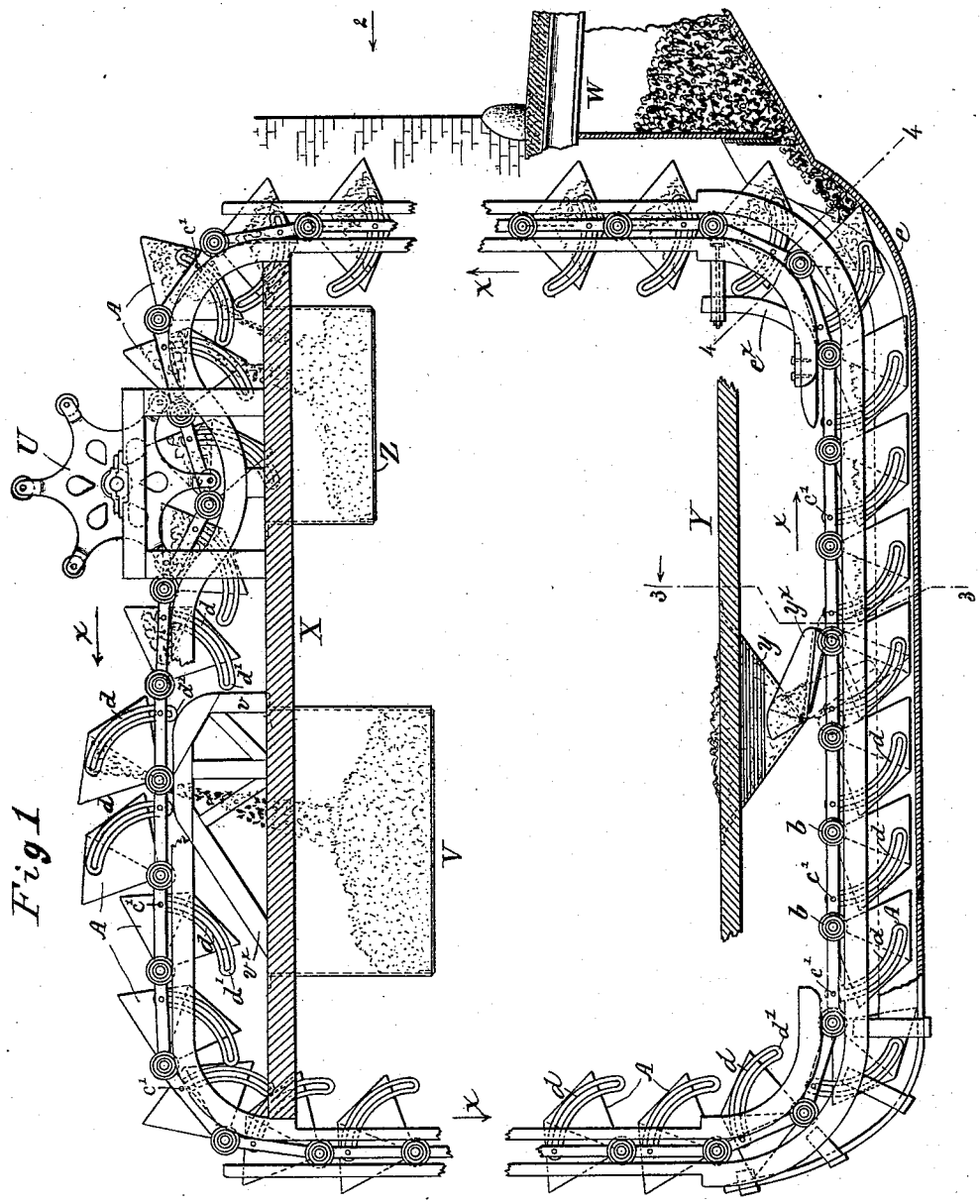
Figure 3:
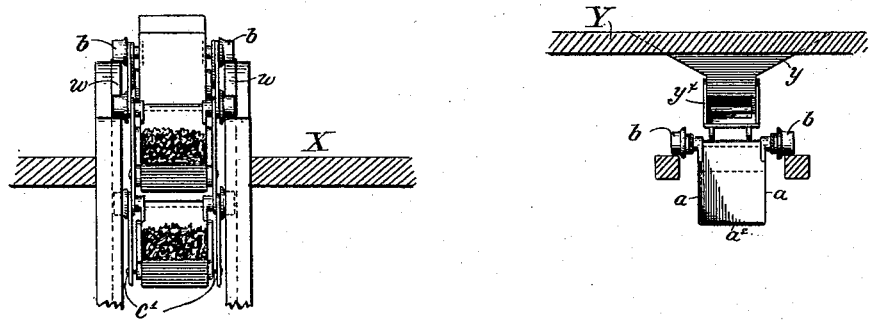
Figure 2:
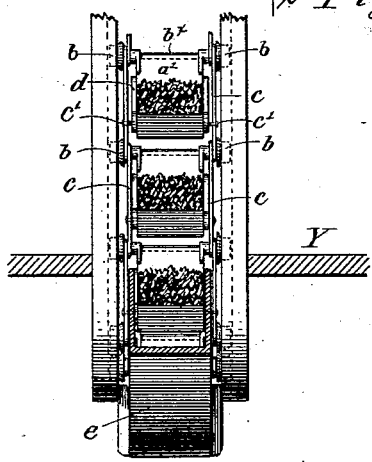
Figure 4:
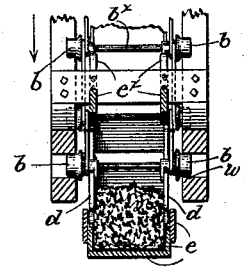
Figure 5:
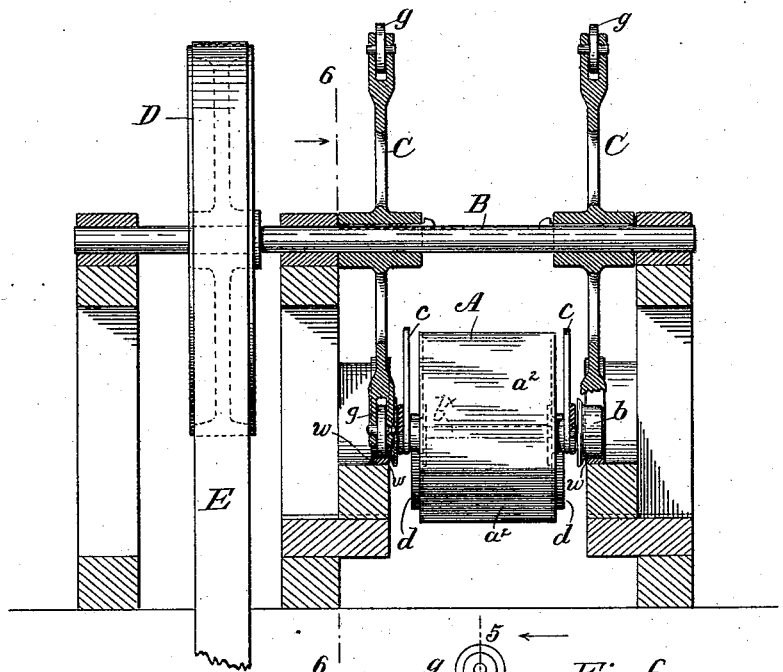
Figure 6:
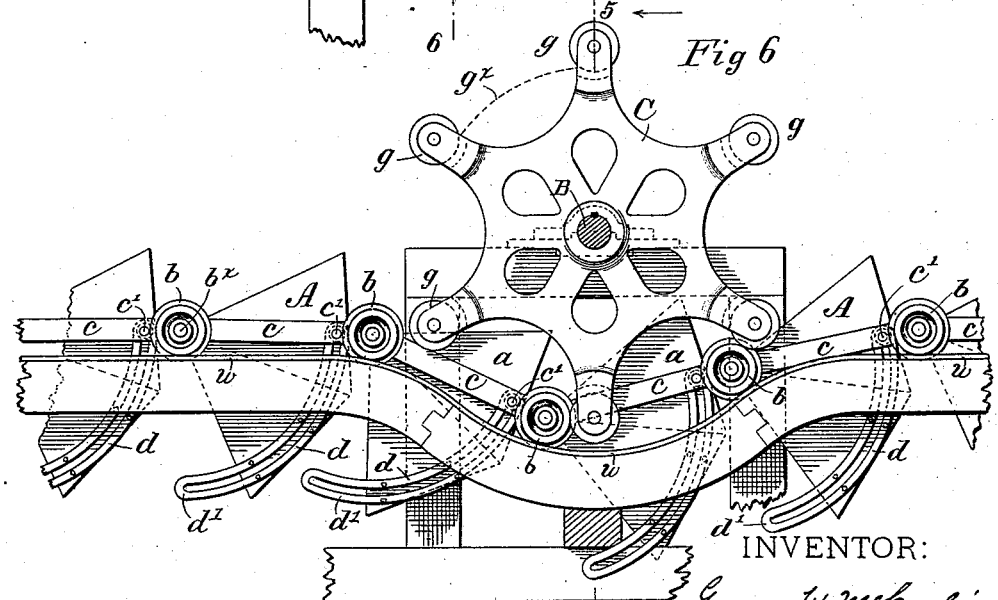

In the accompanying drawings, Figure 1 is sectional side elevation of a conveyer provided with my improvements and adapted for receiving, conveying, and discharging at the same time two kinds of materials, as coal and ashes, for example. Fig. 2 is an end view of the conveyer as seen from the right in Fig. 1. Figs. 3 and 4 are sections taken, respectively, along lines 3 3 and 4 4 in Fig. 1. Figs. 5 and 6 are views on a larger scale, illustrating the construction and operation of the driving mechanism, Fig. 5 being a transverse section taken at right angles to the track in the plane indicated by line 5 5 in Fig. 6, and Fig. 6 is a section taken parallel with the track in the plane indicated by line 6 6 in Fig. 5. Fig. 7 is a longitudinal vertical section of one of the double buckets. Figs. 8 and 9 are views illustrating an arrangement of the driver different from that in Figs. 1 and 6. Fig. 8 is a sectional side view, and Fig. 9 is a cross-section showing the contact of the driver with the wide flange of the conveyer-wheel. Figs. 10, 11, and 12 are views illustrating the embodiment of my invention in a conveyer having single buckets and limiting-stops somewhat different from those seen in Figs. 1 and 6.

As represented in the drawings, my improvements are shown as applied to an endless conveyer in which the entire chain is in one vertical plane and arranged in the form of a rectangle with rounded corners. The materials are received in the lower horizontal portion of the conveyer, carried up vertically, and discharged into bins arranged below the upper horizontal part of the conveyer. This arrangement serves to illustrate the invention fully; but I wish it understood that I do not limit myself to this particular arrangement.

Let X represent a suitable framework or structure—as part of a boiler-house, for example—and Y a floor therein below the general level of the ground and on a level with the ash-pit under the boilers.

Z is an ash hopper or receiver arranged above the level of the ground and adapted to receive ashes from the conveyer.

W is a coal-receiver adapted to receive coal from cars or carts, and V is a bin or hopper above the boiler-room to receive the coal from the conveyer. Around this structure X the endless conveyer extends in a vertical plane, running on a suitable track $w$ and driven in the direction of the arrows $x$ by a driver U, which may be situated as shown in Fig. 1 or at any suitable point.

The conveyer, as seen in Figs. 1 to 7, comprises flanged wheels $b$, the axles $b^\times$ of which are coupled together by links $c$ and the buckets A. The buckets are each double or have two compartments, and each consists of two V-shaped or wedge-shaped sides $a$, a partition-plate $a'$, arranged about midway of the sides, and a back $a^2$, which also serves, together with the plate $a'$, as a bottom for the wedge-shaped double bucket. This bucket is pivotally coupled to the axle at its narrower front end, and its wider rear end is supported against gravity by curved limiting-links $d$, secured to its sides and having in them slots concentric with the pivoting-point of the bucket on the axle $b^\times$. Studs $c'$ in the respective connecting-links $c$ engage the slots in the respective curved links $d$. These slotted links $d$ permit the bucket to turn to a limited but sufficient extent about its pivoted front end.

In the floor Y of the structure is an inclined chute $y$ to lead the ashes or other material into the upper compartment of the bucket as the conveyer moves along under the floor, and in order to prevent the ashes from falling between the buckets and to measure the quantity delivered this chute $y$ is furnished with a hinged or pivoted spout $y^x$ at its lower end, which when free and pendent, as indicated by dotted lines in Fig. 1, forms a substantial continuation of the chute, and when raised, as seen in Fig. 1, it cuts off the flow of ashes from the chute. Thus as each bucket of the series passes under the chute the axle $b^x$ takes under and raises the spout $y^x$, and for the moment the flow of ashes is arrested. When the axle passes, the spout drops and the ashes are allowed to flow into the next bucket. The amount of ashes or other material is thus measured and only the desired quantity is permitted to flow into each passing bucket. Only the upper compartments of the buckets are thus loaded, of course. I do not herein claim this cut-off, as an equivalent device is illustrated and broadly claimed in my Letters Patent No. 409,612, dated August 20, 1889.

As above described, when the conveyer moves along under chute $y$, the upper compartments of the buckets receive their load of ashes, and when the buckets approach the point where the direction of the conveyer changes from horizontal to vertical or upright the lower compartments of the buckets receive their loads of coal or the like. At this point the lower margins or lips of the moving buckets play over the bottom of a fixed trough $e$, which is curved concentrically with the track at this point, and forms a chute leading down from the coal-receiver W. The coal from the receiver enters and flows down the chute $e$, along which the buckets are moving in the opposite direction, and the lower compartments of the buckets scoop up the coal, finally leaving the trough $e$ at the point where the conveyer changes its direction to the vertical. As the conveyer assumes a vertical or upright course, (seen at the right in Fig. 1,) the buckets, being free to swing under the influence of gravity, are suspended and carry their double load up to the point where the conveyer again turns and assumes a horizontal position. At this point the buckets in turning dump their load of ashes into the receiver Z, the ash-compartments of the buckets being on the lower side after the conveyer has changed its course or direction the second time. The limiting-links $d$ on the buckets permit them to swing on their pivots far enough only to assure the dumping of the ashes and the retention of their loads of coal.

As the conveyer moves along and the buckets are brought thereby in succession over the bin or hopper V each bucket is caused to dump its load into the bin or into a chute leading to the bin, being tilted forward and upward by dumping-cams $v$, fixed on the track in position for the respective links $d$ to engage and wipe over them. This cam $v$ is long enough to hold the empty bucket elevated and out of the way until that one next succeeding or behind it is elevated, when the emptied bucket is allowed to descend gradually by a slope $v^x$ on the forward end of the cam. The buckets are now empty, and in the movement of the conveyer they are carried down again, as seen at the left in Fig. 1, turning and assuming their proper positions as they move about the curved portion of the track $w$ and pass onto the lower horizontal portion of the track. In its upward and downward portions the track $w$ may be doubled, as shown at the right and left in Fig. 1, the wheels moving between the two sides or members thereof.

At the point where the buckets move along the curved trough $e$ and are receiving coal they may be prevented from rising in turning about their pivots by means of a curved bar or bars $e^x$, arranged over them, as seen in Fig. 1. The curvature of this bar will conform to the position the buckets are intended to assume as they pass around the curve.

One arrangement of the driver U is seen enlarged in Figs. 5 and 6. At the point where this device is situated the track is depressed, as clearly seen in Fig. 6, and the wheels of the conveyer move at this point in a vertical curve. Over the conveyer is rotatively mounted in a suitable frame a shaft B, on which are fixed two like wheels or spiders C, having arms, in the respective ends of which are rotatively mounted antifriction wheels or rollers $g$. The spiders C rotate in the planes of the track-rails on which the wheels $b$ of the conveyer run, and consequently in the same planes as these wheels, and the rollers $g$ are spaced to correspond with the spacing of the pairs of conveyer-wheels. The object in forming this curve in the track is partly to insure the contact of the rollers on the driving-spider C with two succeeding pairs of conveyer-wheels $b$ at the same time and partly to insure an even and continuous motion of the conveyer by making the track at the driving-point parallel with the path in which the ends of the arms of the spider move. Therefore the curve in the track will be in the main concentric with the shaft B and have easing of reverse curvature where its extremities join the horizontal track both in front and behind. In order to avoid the tendency of the arms of the spider C to lift the rollers of the conveyer from the track-rails, I prefer that the point of contact between the wheel $b$ of the conveyer and the roller $g$ shall be a little above the center of the conveyer-wheel. This serves, also, to keep the conveyer elements down upon the depressed portion of the track, as there is some tendency in the conveyer to straighten up and thus lift or raise these elements. I prefer, also, to arrange this depressed portion of the track at a point where the buckets moving along it will be loaded for the same reason. To insure the more positively against the rising of the conveyer off the track at the depressed curve, the spider C may have a rim between its arms concentric with its axis and arranged in the track of the conveyer-wheels. At the upper part of the spider C in Fig. 6 I have indicated the position of such a rim by the dotted line $g^\times$.

If preferred, the spider C may be arranged at the side of the upright portion of the conveyer, in which case the curve in the track will be lateral instead of depressed. By turning Fig. 6 a quarter-way around to the left it will present substantially the construction above described, or the spider C may be placed beneath the upwardly-curved track, as represented in Figs. 8 and 9; but in this construction the rollers $g$ on the spider should engage the flanges on the wheels $b$, and these latter may be made wide, as seen in Fig. 9, to afford a better contact. In any case the arms of the spider C may engage other parts of the conveyer than the wheel $b$—as a collar on the axle between the wheel $b$ and the bucket, for example.

The rollers $g$ are not absolutely essential, as the driver U could be used without these rolling contacts, the arms on the spider coming into direct contact with the wheels $b$ or other parts; but the wheels $g$ reduce the friction very materially.

Whether the curve in the track be depressed or otherwise, the points of driving-contact and the centers of the rollers $g$ should be situated at a less radial distance from the axis of the driver than the centers of the conveyer-wheels are therefrom.

Any driving-gear may be employed for rotating shaft B and intermediate gear-wheels will usually be employed for regulating the speed; but this is a matter within the skill of any machinist. I have merely shown a pulley D on the shaft B and a driving-belt E on said pulley.

I am aware that some forms of endless-chain conveyers have been mounted on and carried by sprocket-wheels and that these sprocket-wheels have been employed as drivers; but my driver does not carry the conveyer, nor is it arranged necessarily at a point where the conveyer changes direction, as in the case of such sprocket-wheels.

My invention may be embodied in a conveyer having single as distinguished from double buckets, and I have illustrated such an embodiment in Figs. 10, 11, and 12. In these Fig. 10 is a side elevation of part of a conveyer, showing two wedge-shaped single buckets $A^\times$, having curved backs, and Fig. 11 is a similar view showing one bucket in side elevation and one in section. Fig. 12 shows a part of one of the buckets of Fig. 10 as seen from the rear.

In lieu of a curved and slotted link on the bucket as a stop for limiting its movement about its pivot at one end I may employ two projections $d^\times$, as seen in Figs. 10 and 12, adapted to engage the link $c$, or in lieu of this the bucket may be provided with stops $d^{\times\times}$, projecting rearwardly and engaging the axle $b^\times$ or the boss of the frame on the next succeeding bucket at the pivot-points, as seen in Fig. 11. The bucket may have projections $d'$ to serve in dumping, the same functions as the projecting ends of the links $d$ of Figs. 1 and 6, and also to secure one of the stops $d^\times$ or $d^{\times\times}$ on in case the bucket is to be allowed considerable play. These limiting-stops may be arranged in various ways without material departure from my invention, the essential feature being a bucket pivoted in the endless chain at one end and free to swing to some extent between limiting-stops at its other end. The advantage of this mode of mounting a bucket is that it is in all respects a gravity-bucket in the upright portion of the conveyer and can be dumped with the same advantages as a gravity-bucket. Nevertheless when in the horizontal portion of the conveyer, and even on a moderately-steep incline, it loses its character as a gravity-bucket and becomes stable, being supported at two points in the conveyer-chain—that is, in the part of the conveyer comprising the axles or their equivalents and the connecting links $c$. By "equivalents of the axles" I mean transverse rods which would replace the axles if the wheels $b$ of the conveyer were mounted on studs $m$, projecting from the links $c$ at points about midway of their lengths. The rollers $g$, mounted in the arms of the spider or wheel C, form parts of the said arms in substance, and may be considered as the parts of the arms which contact with the wheels of the conveyer.

I do not herein claim, broadly, a pivotally-mounted bucket provided with a limiting-stop to engage the chain, as this feature is shown and claimed in my pending application, Serial No. 434,973.

In the present application the bucket is hung in the chain at or near one end and the stop is arranged at or near the other end, as clearly set forth.

Having thus described my invention, I claim—

1. An endless-chain conveyer comprising an endless chain mounted on a track and buckets carried in said chain, the said buckets being pivotally mounted in the chain at one end and provided at the other end with stops which engage some part of the chain and limit the swing of the bucket, whereby the latter is at times suspended at two points in its length in a stable manner.

2. An endless-chain conveyer comprising an endless chain provided with track-wheels and buckets carried in said chain, said buckets being pivoted at their front ends to the axles of the track-wheels and provided at their other ends with limiting-stops which engage some part of the conveyer-chain and limit the extent of swing of the bucket about its pivot, as set forth.

3. An endless-chain conveyer comprising an endless chain provided with track-wheels and a series of wedge-shaped buckets carried by said chain, each of said buckets being pivoted at its front end to one of the axles and provided at its rear end with limiting-stops adapted to engage some part of the conveyer-chain and support the rear end of said bucket.

4. An endless-chain conveyer comprising an endless chain provided with track-wheels and a series of double buckets, the compartments of which are arranged bottom to bottom, as set forth, each of said buckets being pivoted in the chain at its forward end and provided at its rear end with limiting-stops which are adapted to engage some portion of the chain and limit the swing of the bucket about its pivot.

5. The combination, with the endless track having a lower portion where the load is received, an upper portion where the load is discharged, and ascending and descending portions, of an endless chain having track-wheels mounted on said track and a series of buckets mounted in said chain, pivoted at their forward ends and provided at their other ends with limiting-stops adapted to engage some portion of the chain and support that end of the bucket while it is receiving its load, and a chute arranged over the conveyer at the loading-point, substantially as set forth.

6. The combination, with the endless track, the endless chain having track-wheels mounted on said track, and the buckets pivoted at their front ends in said chain and provided with limiting-stops at their other ends, of the curved trough or chute $e$, arranged under the conveyer and about that point in the track where the conveyer turns to ascend, the said trough arranged in the path of the buckets, whereby the latter meet and scoop up the material which flows down said trough.

7. An endless-chain conveyer having buckets each with two compartments whereby it is adapted for conveying simultaneously different kinds of materials, in combination with independent chutes or hoppers for filling the compartments in the buckets, and means for discharging the loads independently from said compartments.

8. In an endless-chain conveyer, the combination, with the endless chain composed of links $c$ and axles or cross-rods $b^\times$, of the bucket mounted in said chain and pivoted at its front end to said axles, said bucket being provided at its respective sides with the curved and slotted links $d$, and said links $c$ being provided with studs which engage the slots in the respective links $d$, whereby the ends of said slots serve as stops to limit the extent of movement of the bucket about its pivot.

9. In a conveyer, the combination, with an endless track having in it a curve connected with the track at its respective extremities by easings of reverse curvature, as set forth, an endless chain mounted on wheels on said track, and buckets carried by said chain, of a driver consisting of a pair of spiders C, and a shaft on which said spiders are mounted, the arms of the spiders engaging some part of the conveyer, the curvature of the track being substantially concentric with the shaft of the driver, as set forth.

10. In a conveyer, the combination, with an endless track having in it a depressed curve with easings of reverse curvature which connect its respective extremities to the straight track in front of and back of the driver and an endless-chain conveyer mounted on wheels on said track and provided with pivotally-mounted buckets, of the driver arranged over said depression in the track, said driver comprising a rotating shaft B, set concentrically, or nearly so, with said depressed curve, and two spiders C on said shaft in the planes of the respective track-wheels of the conveyer and adapted to drive the conveyer by contact of its arms with the track-wheels, as set forth.

11. In a conveyer, the combination, with a track having in it a curve and an endless-chain conveyer on said track, provided with two series of track-wheels and pivotally-mounted buckets, of a driver arranged at the driving-point, said driver comprising two rotatively-mounted spiders C, arranged substantially concentric to the curve in the track and in the planes of the respective series of track-wheels, the arms of said spiders bearing on the track-wheels at points less distant from the centers of the spiders than the centers of the track-wheels are therefrom, whereby the driving-pressure serves to press the track-wheels radially outward against the tracks, as set forth.

12. In a conveyer, the combination, with an endless track having a curve with easings of reverse curvature connecting its respective extremities with the track before and behind the driver and a driver comprising spiders C on a rotatively-mounted shaft placed substantially concentric with said curve, said spiders having rollers in its arms, of the endless-chain conveyer mounted on wheels on said track, the axes of the conveyer-wheels being at a greater radial distance from the driver-axis than the axes of said rollers, substantially as an for the purposes set forth.

13. In a conveyer, the combination, with a track having in it a curve connected to the main track by an easing of reverse curvature and an endless-chain conveyer having track-wheels mounted on said track and buckets mounted in the chain, of a driver situated at said curve in the track and substantially concentric therewith, said driver comprising a rotatively-mounted shaft, and spiders on said shaft, the arms of said spiders being arranged to drive the conveyer by contact with some part thereof as the spiders rotate, substantially as set forth.

In witness whereof I have hereunto signed my name in the presence of two subscribing witnesses.

GEO. W. McCASLIN.

Witnesses:
PETER A. ROSS,
J. D. CAPLINGER.